Jan. 12, 1971 W. M. TENER 3,555,483
CRYOGENIC LIQUID SENSOR
Filed Sept. 3, 1968 2 Sheets-Sheet 2
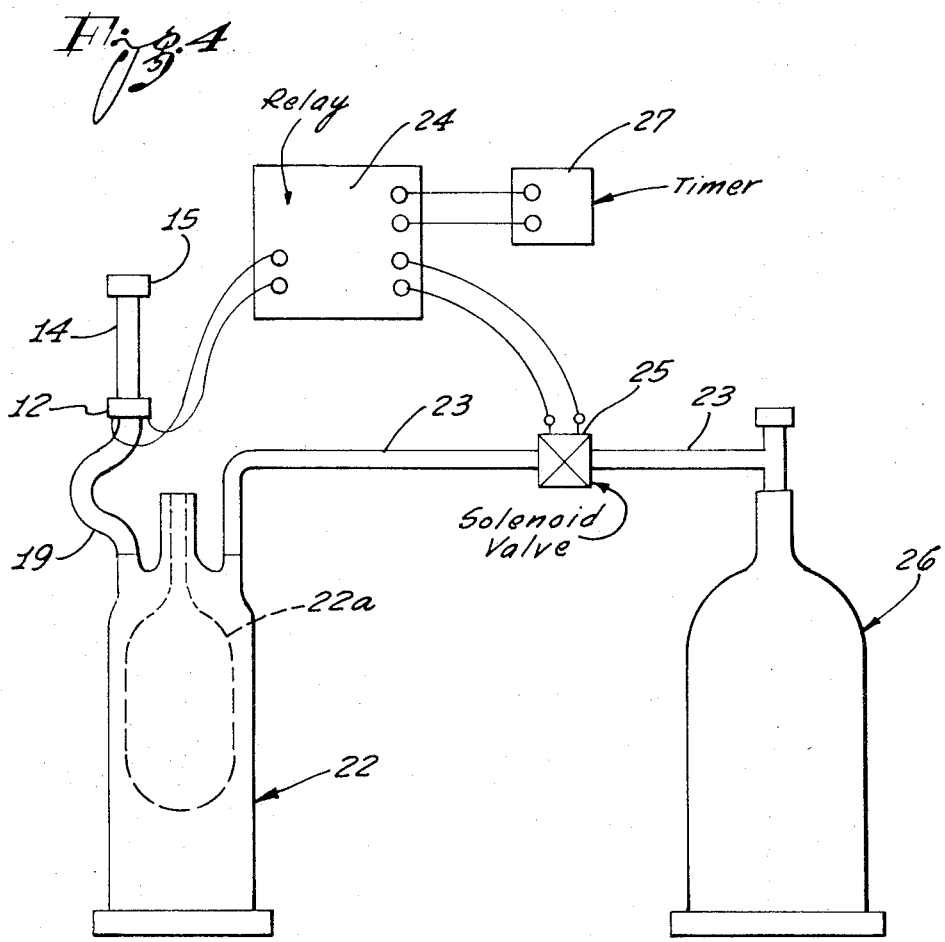
INVENTOR:
Wallis M. Tener
ATTORNEY

United States Patent Office 3,555,483
Patented Jan. 12, 1971

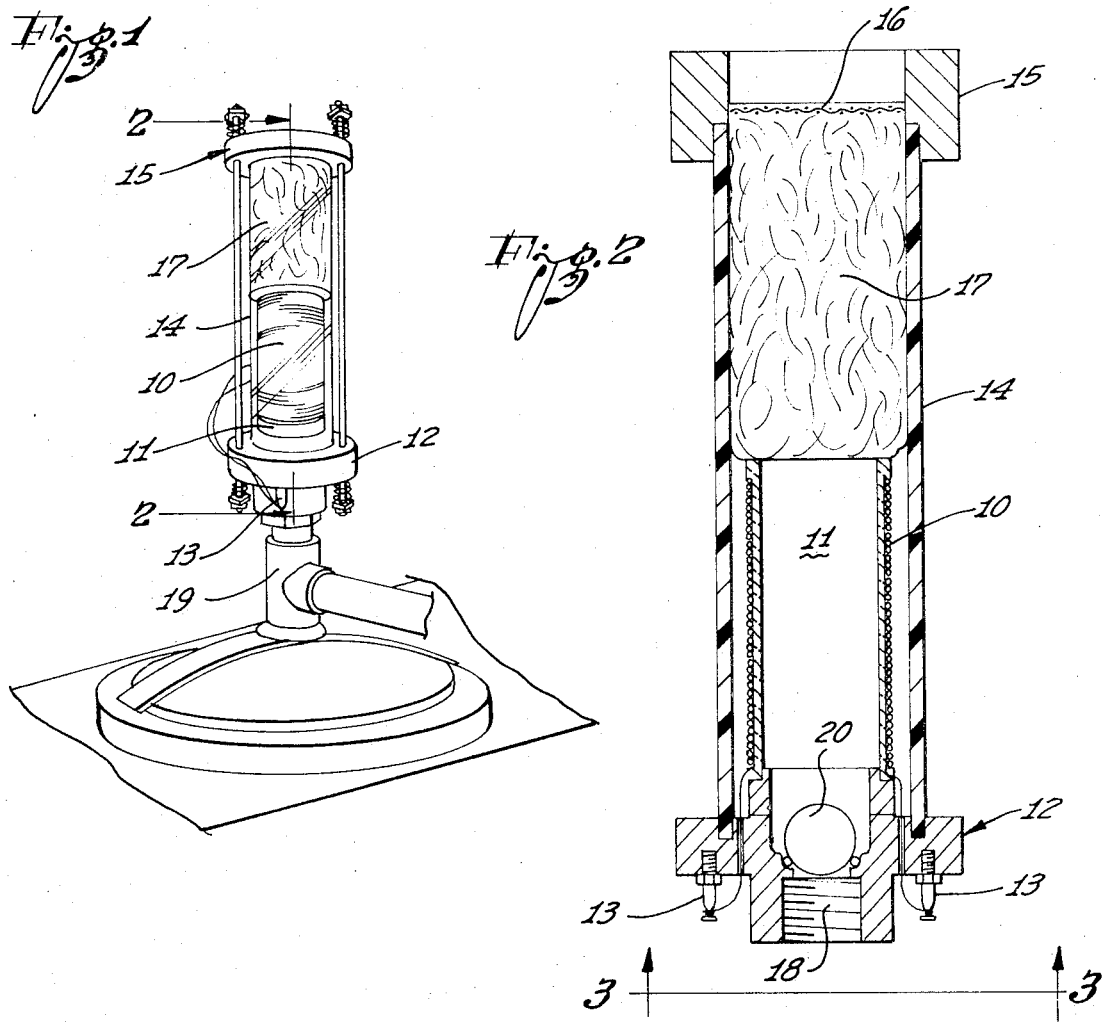
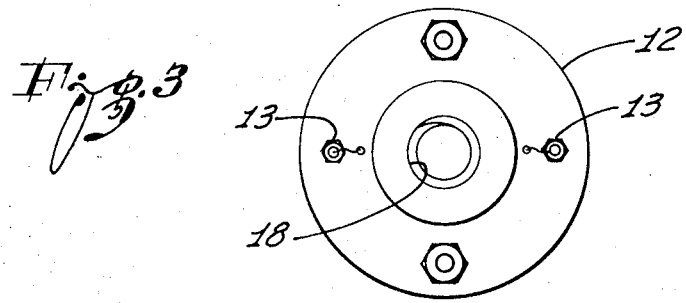

1

3,555,483
CRYOGENIC LIQUID SENSOR
Wallis M. Tener, Altadena, Calif., assignor to California Institute of Technology, Pasadena, Calif., a corporation of California
Filed Sept. 3, 1968, Ser. No. 757,017
Int. Cl. H01c 7/00; G01f 23/24
U.S. Cl. 338—25                              5 Claims

ABSTRACT OF THE DISCLOSURE

A sensor unit for use in conjunction with a cryogenic vessel is provided, and which may be used to respond selectively to the presence of a liquid in a two phase gas/liquid flow, such as the overflow from a cryogenic vessel vent or cryogenic transfer tube. The sensor may be used to trigger relays and solenoid operated valves, so as to shut off the supply to the vessel when the cryogenic liquid starts to overflow. The unit includes an electric resistance wire element which is wound on a porous tubular support member. The electrical resistance of the wire element decreases to provide a desired electrical control effect when the porous tubular support member becomes saturated with the cryogenic liquid. However, the resistance of the wire element is relatively unaffected by cold gases passing through the tubular support member since it is thermally insulated from such gases by the support member in its unsaturated condition.

The invention described herein was made in the performance of work under an NASA contract and is subject to the provisions of Section 305 of the National Aeronautics and Space Act of 1958, Public Law 85–568 (72 Stat. 435; 42 USC 2451).

BACKGROUND OF THE INVENTION

It is often necessary to store cryogenic liquids of low boiling point, such as liquid helium. Such liquids, however, are subject to costly evaporation losses when the temperature within the storage zone rises above an extremely low level. In order to minimize such losses, lower cost cryogenic liquids, such as liquid nitrogen, are often supplied to the jacket of the vessel forming the aforesaid storage zone. These lower cost cryogenic liquids serve as an insulation layer for the high cost cryogenic liquid in the storage zone.

The cryogenic liquid, such as liquid nitrogen, in the jacket of the aforesaid vessel is subject to evaporation losses in the case of a long term storage, and it must be periodically topped off. In the past, and in the absence of satisfactory low cost automatic cryogenic liquid filling and overflow monitoring devices, constant human attention and effort was required, and much time was spent, in assuring that the jackets of the cryogenic vessels were properly filled at all times in order to avoid evaporation losses of the more expensive cryogenic liquids in the central storage zones thereof.

Specifically, prior to the concept of the sensor of the present invention, no satisfactory inexpensive device was available on the market for monitoring the overflow of the cryogenic liquid in the jacket of the aforesaid vessel. Therefore no suitable automatic system for maintaining the jackets in a topped off condition could be devised. Although an automatic system could be devised to introduce additional cryogenic liquid periodically in the jackets, some means had to be provided to terminate the operation of the cryogenic filling mechanism when the overflow point is reached. As mentioned above, the improved sensor of the present invention is particularly suited for such a purpose.

Attempts in the past to use temperature sensitive resistance wire elements as overflow sensors for the aforesaid purpose were not successful. This primarily was due to the fact that such elements respond to temperature drops caused not only by an overflow of the cryogenic liquid, but also by cold purging gases which normally issue from the jackets of the cryogenic containers. It is important to the success of the sensor when used to sense the overflow of a highly volatile cryogenic liquid, that it not only respond readily to the overflow of the cryogenic liquid, but that it be unresponsive to the gases whose flow actually precedes the liquid overflow conditions.

Then sensor of the present invention is capable of responding to the flow of the cryogenic liquid and to be unresponsive to the said gas flow. The sensor, therefore, is particularly suited for the purposes described above, namely, to sense overflow of the cryogenic liquid from the jackets of the storage vessels. However, it will become evident as the description proceeds, that the sensor of the invention has general application wherever the flow of cryogenic liquid, or other gas/liquid phase fluid, is to be monitored. Such applications are prevalent, for example, in the liquefied natural gas industry; and also in the government services, specifically for regulating the liquid levels in liquid propellant vessels and auxiliary equipment, and for maintaining such levels in a topped off condition.

The cryogenic liquid sensor of the present invention is advantageous in that it can be used in conjuntcion with vessels where the insertion of a probe or other sensing device into the vessel is unpractical. The system is also advantageous in that its components are simple, inexpensive and readily available. The sensor, moreover, is easily attached to the cryogenic vessels. Moreover, the sensor is reliable in its operation, and responds readily to the presence of the cryogenic liquid to provide a desired electrical control effect, while being unresponsive to the flow of cold gases through the sensor.

SUMMARY OF THE INVENTION

The sensor of the invention includes an electrical resistance element which is wound on a porous tubular coil form. The tubular coil form is positioned to become saturated by the presence of cryogenic liquid in the sensor. The saturation of the tubular coil form by the cryogenic liquid changes the coil form from a thermal insulator to a thermal conductor. The resulting flow of heat from the resistance element wound on the coil form lowers the temperature and, thus the resistance of this element sufficiently to provide a desired electrical control effect. The passage of cold gases through the sensor has no appreciable effect on the thermal characteristics of the coil forms supporting the resistance element, and such gases are incapable of reducing the temperature, and therefore the resistance of the resistance element on the coil form sufficiently to establish the electrical control effect.

BRIEF DESCRIPTION OF THE DRAWINGS

FIG. 1 is an elevational view of a sensor constructed in accordance with the concepts of one embodiment of the invention;

FIG. 2 is a section of the sensor of FIG. 1, taken substantially along the line 2—2 of FIG. 1;

FIG. 3 is a bottom view of the sensor of FIG. 2, taken along the line 3—3 of FIG. 2; and FIG. 4 is a schematic representation of a control system incorporating the sensor of the invention.

DETAILED DESCRIPTION OF THE ILLUSTRATED EMBODIMENT

The sensor of FIGS. 1–4 includes, for example, a tubular housing 14 which may be composed of transparent plastic, glass or other suitable transparent, translucent material so that some heat will be conducted into the sensor. The ambient room heat is usually sufficient for this purpose. The material can be opaque only if it will pass enough heat or if extra heat is provided. A base member 12 is provided at the lower end of the tubular housing 14, and the base 12 provides an inlet 18 which may, for example, be threaded to the upper end of a vent overflow line 19, as shown in FIG. 4. A porous tubular coil form 11 is supported inside the housing 14 in coaxial relationship with the wall of the housing. The coil form 11 is supported on the base member 12 as shown. The coil form is composed of a porous electrical insulating material such as cardboard, ceramic, asbestos, or the like. The base member is fabricated from electrical insulating material, such as "Micanda," ceramic, or the like.

The coil form 11 serves as a support for an electrical resistance element 10. The electrical resistance element 10 may be in the form of a coil of fine copper wire, since copper exhibits desirable temperature-resistance characteristics at the low temperatures of most cryogenic fluid to be sensed by the sensor. The ends of the resistance element coil may be brought out through appropriate holes in the base member 12 and connected to electric terminals 13, as shown. The electric terminals 13 are supported on the base member 12 externally of the housing 14.

A quantity of packing material 17 is inserted into the upper end of the housing 14, and it serves to retain the coil form 11 in its coaxial position. However, the main purpose of the packing material is to diffuse the liquid globules and cause them to run back into the porous coil form, but to allow the gas to escape. The packing material also serves to prevent any liquid which was not deflected by the ball from blowing out the top, thereby using more of the first drops of liquid to saturate the coil form resulting in a quicker control action. The packing material is held in place, for example, by a tubular cap 15 which is mounted at the upper end of the housing 14. The cap 15 supports a wire mesh 16 across the upper end of the container. The packing material 17 and wire mesh 16 permit all gases from the line 19 to flow freely from the housing 14. These gases flow into the sensor through the inlet 18, through a check valve 20, and then through the interior of the tubular coil form 11. The check valve also acts as a diverter to direct the liquid content of the first discharge against the inside wall of the porous coil form to speed up the saturation thereof. The valve also acts as a check valve when the filling cycle has been completed, preventing any back-streaming of air back into the vessel where it could condense and freeze causing an ice plug. The gases then pass through the packing material and out the top of the housing 14 through a wire mesh 16.

In the operation of the sensor unit illustrated in FIGS. 1–3, the flow of purged gases through the sensor has no appreciable affect on the electrical resistance sensing element 10, because the tubular coil form 11 effectively insulates the sensing element from such gases. However, when a cryogenic liquid flows into the container through the inlet 18, the coil form 11 becomes saturated with the cold liquid cryogenic material, and it then becomes a thermal conductor, rather than a thermal insulator. The temperature of the electric resistance element therefore drops, as does its electrical resistance. The sensor therefore responds to the low temperature of the cryogenic liquid, to exhibit an appreciable decrease in resistance between the terminals 13. This decrease in resistance, as will be described, may be used to create a control effect to terminate the supply of the cryogenic fluid to the vessel being monitored.

In the system of FIG. 4, the sensor is shown as mounted in the vent line 19 of the jacket of a vessel 22. The vessel 22 has a central storage zone 22a which contains, for example, a cryogenic material, such as liquid helium of a very low boiling point. The liquid helium, as mentioned above, is subject to costly evaporation losses when the temperature within the central storage zone 22a rises above an extremely low level, such as $-4.2°$ K.

In order to minimize such losses from the central storage zone 22a, the lower cost cryogenic material such as liquid nitrogen is supplied to the jacket of the vessel 22. The liquid nitrogen serves as an insulating layer for the central zone of the vessel. The liquid nitrogen is maintained at its normal liquid temperature of about $77.3°$ K.

As also explained previously herein, the nitrogen in the jacket of the vessel 22 is subject to evaporation losses, and as a result the liquid level in the jacket gradually falls. This, if not corrected, leads to temperature rises and corresponding losses of the liquid helium in the central storage zone 22a. To compensate for the loss of liquid nitrogen in the jacket of the vessel 22, a source 26 if liquid nitrogen is provided in the system of FIG. 4. This source provides additional liquid nitrogen, for example, to the jacket of the vessel 22 through the conduit 23, and whenever the solenoid valve 25 in that conduit is opened.

A timer 27 is provided that periodically trips a relay 24 which, in turn, causes the solenoid valve 25 to be energized and opened. Therefore at specific time intervals, as determined by the timer 27, the solenoid valve 25 is opened, so as to replenish the liquid nitrogen in the jacket of the vessel 22. The valve 25 remains open until the liquid nitrogen in the jacket begins to overflow into the sensor of the invention through the vent line 19. The resulting drop in the resistance of the sensing element 10 within the sensor, when such an overflow condition occurs, provides the desired control effect to the relay 24, so that the solenoid valve 25 is de-energized and turned off.

It will be appreciated that during the filling operation of the jacket of the vessel 22, gases flow through the overflow line 19, and it is important for the sensor to be unresponsive to such gases. This is achieved by the sensor of the present invention, for the reasons described. The sensor remains unresponsive to the gas flow through the overflow line 19, and it operates only when the actual cryogenic liquid is present in sufficient quantity such that the coil form 11 is saturated, so as to provide a thermal path to the electrical resistance element 10.

It should be stressed that although the sensor of the present invention has been described herein in conjunction with a particular application, it finds a variety of uses wherever the flow of cryogenic or other fluid is to be monitored. In addition, although a particular form of the invention has been described, other equivalent forms are feasible, and all such forms falling within the concept of the invention are intended to be covered by the following claims.

What is claimed is:

1. A sensor for sensing the presence of a liquid having a temperature different from the ambient temperature to which the sensor is normally exposed, the sensor being unresponsive to gases having the same temperature as the liquid and having temperatures different from the aforesaid ambient temperature, and said sensor including:

a tubular housing having an inlet at one end into which such liquid and gases may flow and having an outlet at its other end to permit the free flow of such gases therethrough;

a tubular porous member mounted in said housing in position to permit such gases to pass therethrough, and to become wetted by said liquid and thereby exhibit increased thermal conductivity characteristics in the presence of said liquid in said housing; means to prevent such gases from flowing between said tubular porous member and said housing;

an electrical wire resistance element wound around said tubular porous member and exhibiting an electrical resistance differential as said porous member becomes wetted by said liquid; and means extending to the exterior of said housing to allow said electrical wire resistance element to be connected to an electrical device.

2. The sensor defined in claim 1 in which said liquid sensed by said sensor is a volatile liquid having an extremely low temperature boiling point.

3. The sensor defined in claim 1, in which said porous tubular member is composed of an absorbent ceramic material.

4. The sensor defined in claim 1, and which includes a check valve in the inlet to said housing.

5. The sensor defined in claim 1, and which includes a quantity of packing material positioned in said housing at the outlet end thereof.

References Cited

UNITED STATES PATENTS

| | | | |
|---|---|---|---|
| 2,411,120 | 11/1946 | Von Hortenau | 338—25 |
| 2,588,840 | 3/1952 | Howland | 338—25X |
| 2,752,586 | 6/1956 | Jordan | 200—61.04X |
| 3,391,546 | 7/1968 | Campbell | 62—48X |
| 3,430,450 | 3/1969 | Vogner et al. | 62—45 |
| 3,433,248 | 3/1969 | Hedshom | 62—49X |
| 3,442,091 | 5/1969 | Klipping et al. | 62—55 |

ALBERT W. DAVIS, Jr., Primary Examiner

U.S. Cl. X.R.

62—49, 55; 73—295, 362; 200—61.04, 61.05; 340—245, 419